United States Patent [19]
Bagherpour et al.

[11] Patent Number: 5,751,079
[45] Date of Patent: May 12, 1998

[54] ALTERNATOR WITH INTERNAL AND EXTERNAL FANS

[75] Inventors: Bo Bagherpour, Ypsilanti; Ralph Kurt Hesse, Howell; Kenneth Ross Brooks, Dexter, all of Mich.

[73] Assignee: Ford Motor Company, Dearborn, Mich.

[21] Appl. No.: 733,355

[22] Filed: Oct. 17, 1996

[51] Int. Cl.⁶ .................................................. H02N 9/06
[52] U.S. Cl. .................. 310/59; 310/62; 310/63; 310/89
[58] Field of Search ........................ 310/59, 62, 63, 310/64, 65, 89

[56] References Cited

U.S. PATENT DOCUMENTS

| | | | |
|---|---|---|---|
| 3,422,339 | 1/1969 | Baker | 310/68 |
| 3,502,916 | 3/1970 | Stavrache et al. | 310/59 |
| 3,538,362 | 11/1970 | Cheetham et al. | 310/68 |
| 3,566,168 | 2/1971 | Matsubara et al. | 310/105 |
| 3,666,978 | 5/1972 | Renner | 310/62 |
| 3,749,953 | 7/1973 | Baumann et al. | 310/62 |
| 4,162,419 | 7/1979 | DeAngelis | 310/266 |
| 4,492,885 | 1/1985 | Kitamura et al. | 310/62 |
| 4,544,855 | 10/1985 | Prenner et al. | 310/59 |
| 4,604,538 | 8/1986 | Merrill et al. | 310/68 D |
| 4,710,657 | 12/1987 | Ocken et al. | 310/62 |
| 4,908,538 | 3/1990 | Geberth, Jr. | 310/59 |
| 4,952,828 | 8/1990 | Yu-fang et al. | 310/68 D |
| 4,961,016 | 10/1990 | Peng et al. | 310/62 |
| 5,233,255 | 8/1993 | Kusumoto et al. | 310/62 |
| 5,235,229 | 8/1993 | Tanaka et al. | 310/62 |
| 5,237,232 | 8/1993 | Kitamura | 310/263 |
| 5,394,041 | 2/1995 | Oberdorfer-Bogel | 310/64 |

FOREIGN PATENT DOCUMENTS

| | | |
|---|---|---|
| 8201966 | 6/1982 | Japan. |
| 3215146 | 9/1991 | Japan. |

*Primary Examiner*—Steven L. Stephan
*Assistant Examiner*—Michael J. Wallace, Jr.
*Attorney, Agent, or Firm*—Mark S. Sparschu, Esq.; Roger L. May, Esq.

[57] ABSTRACT

An alternator for use with a motor vehicle including a housing. A separator plate is positioned within said housing to define front and rear air control volumes. A plurality of fans draw air through the respective front and rear air control volumes to cool the alternator during operation.

11 Claims, 2 Drawing Sheets

5,751,079

1

ALTERNATOR WITH INTERNAL AND EXTERNAL FANS

BACKGROUND OF THE INVENTION

1. Field of the Invention

The present invention relates to an AC generator for use with an automotive vehicle. More particularly, the present invention relates to an AC generator having a plurality of cooling fans and air flow paths.

2. Description of the Related Art

AC generators, or as they are more commonly referred to, alternators, are used to generate electrical power for use during operation of a motor vehicle. During operation, the alternator generates heat. The heat must be dissipated to ensure proper operation of the alternator. It is well known in the art to use at least one fan to establish an air flow over the components of the alternator to cool and maintain the alternator at proper operating temperature.

Previous designs included a fan assembly positioned outside the alternator housing. The fan operated to draw air through the housing along an axial path in a direction parallel to the shaft of the alternator. In an attempt to increase air flow and cooling efficiency, an additional fan was added to the alternator. For example, internal fans are used in connection with external fans to increase air flow through the alternator housing. See U.S. Pat. No. 4,952,828. Additionally, alternators having dual internal fans are known. See U.S. Pat. Nos. 5,235,229 and 5,233,255.

Although such dual fan assemblies have worked in the past, they suffer in that the fans tend to counteract each other. The flow paths or respective air streams generated by each fan interfere with one another; i.e., the front fan pulls in air exhausted by the rear fan, thereby decreasing cooling efficiency.

SUMMARY OF THE INVENTION

Accordingly, the present invention is an apparatus for cooling the components of an alternator during operation. The apparatus includes an alternator having a housing formed of front and rear portions joined together. A shaft extends through and is journaled within the respective front and rear housing portions. A stator assembly is connected to the housing and a rotor assembly is connected to the shaft. An external fan is connected to the shaft adjacent the front portion of the housing. An internal fan is connected to the shaft between the rotor and the rear portion of the housing. A separator plate is connected to the interior of the housing between the internal fan and the rotor and extends radially inward. The separator plate defines front and rear air control volumes, the internal fan moving air along a predetermined path through the rear air control volume and the external fan moving air along a predetermined path through the front air control volume.

One feature of the present invention is the separator plate which defines separate air control volumes on each side thereof through which air is drawn by the respective internal and external fans.

Further features include defined air flow paths through the respective air control volumes. In the rear air control volume, the air is drawn in axially and exits or is dispersed radially by the internal fan. In the front air control volume, the air is drawn in radially, flows axially in a direction parallel the shaft of the alternator, exits the front portion of the housing in an axial direction and is then dispersed radially by the external fan.

2

An additional feature is such that the inlet and outlet ports of the respective front and rear air control volumes are skewed or offset on the outer surface of the respective front and rear portions of the housing. Offsetting the inlet and outlet ports keeps the air flow paths separate and reduces any opportunity for the air exiting the rear air control volume from being drawn into the front air control volume.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
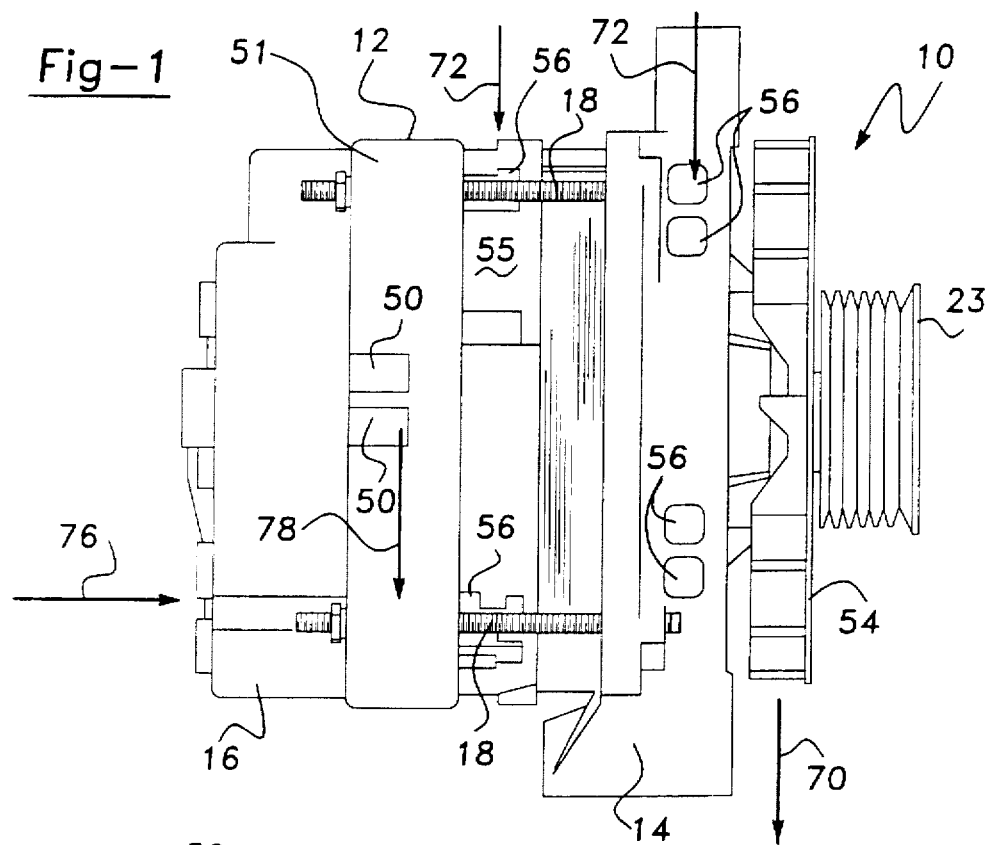
FIG. 1 is a perspective view of an alternator according to the present invention.
Figure 2:
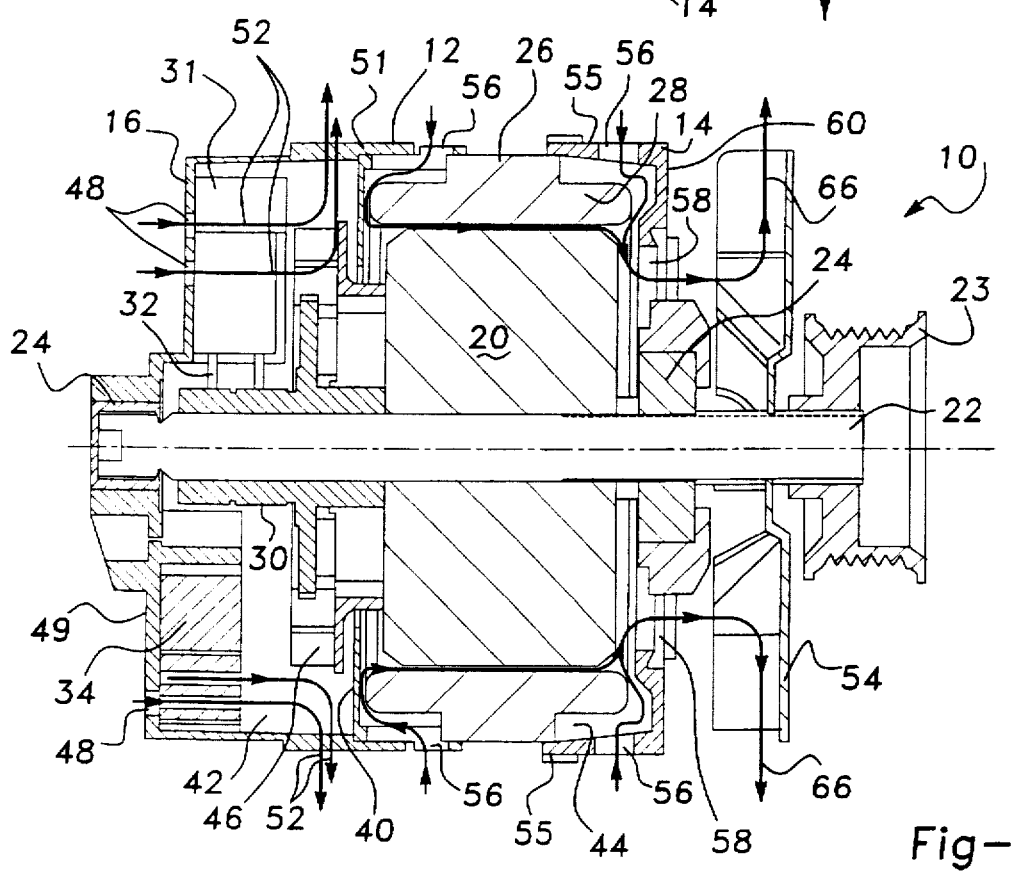
FIG. 2 is a cross-sectional view of the alternator of FIG. 1 taken along lines 2—2.

Referring to FIGS. 1 and 2, an alternator 10 according to the present invention is shown. The alternator 10 includes a generally cylindrical housing 12 formed of front and rear housing portions 14, 16. The front and rear portions 14, 16, typically made of a metal such as aluminum alloy, are connected by a plurality of bolts 18. An inner core or rotor 20 is secured to a shaft 22 which is rotatably supported on a pair of bearings 24 secured in the housing 12. A pulley 23 is connected to the shaft 22. A remote power source (not shown) transfers power, typically through a belt, to the pulley 23 to rotate the shaft 22.

A stator 26 having a plurality of windings 28 thereon is secured to the housing 12. The alternator 10 further includes slip rings 30, a brush holder 31 and a brush 32, and a rectifier 34. The brush holder 31 serves to bring the brush 32 into pressure contact with the slip rings 30 to facilitate current flow from the alternator for use externally on the vehicle. These components are normally positioned in the rear housing portion 16 of the alternator 10, and during operation, generate heat.

As shown in FIG. 2, the alternator 10 further includes a separator plate 40 connected to the stator 26 and extending radially inward toward the shaft 22. The rear housing 16 is connected to the separator plate 40. The separator plate 40 divides the interior of the housing 12 into a plurality of air control volumes, shown herein as a rear air control volume 42 and a front air control volume 44.

An internal fan 46 is secured to the shaft 22 and rotates therewith. The internal fan 46 draws air into the rear air control volume, in the direction shown by arrow 76, through a plurality of rear air inlet ports 48 positioned in the rear face 49 of the rear housing portion 16. A plurality of rear air outlet ports 50 are positioned on the cylindrical outer surface 51 of the rear housing portion 16. During operation or rotation of the shaft 22, the internal fan 46 draws air in through the rear inlet ports 48. The air flows axially in a direction parallel the shaft 22, and exits radially through the rear outlet ports 50 in the direction shown by arrow 78. The air flow path 52 through the rear air control volume 42 is shown in FIG. 2.

At the same time, an external fan 54, mounted to the shaft 22, draws air into the front air control volume 44, in the direction shown by arrow 72, through a plurality of front air inlet ports 56 positioned on the cylindrical outer surface 55 of the front housing portion 14. The air is drawn over the stator windings 28 and across the rotor 20 and exits axially through front air outlet ports 58 located on the front face 60 of the front housing portion 14. The external fan 54 then disperses the air exiting the front air control volume 44 in a radial direction indicated by arrow 70. The air flow path 66 through the front air control volume 44 is shown in FIG. 2.

Figure 3:
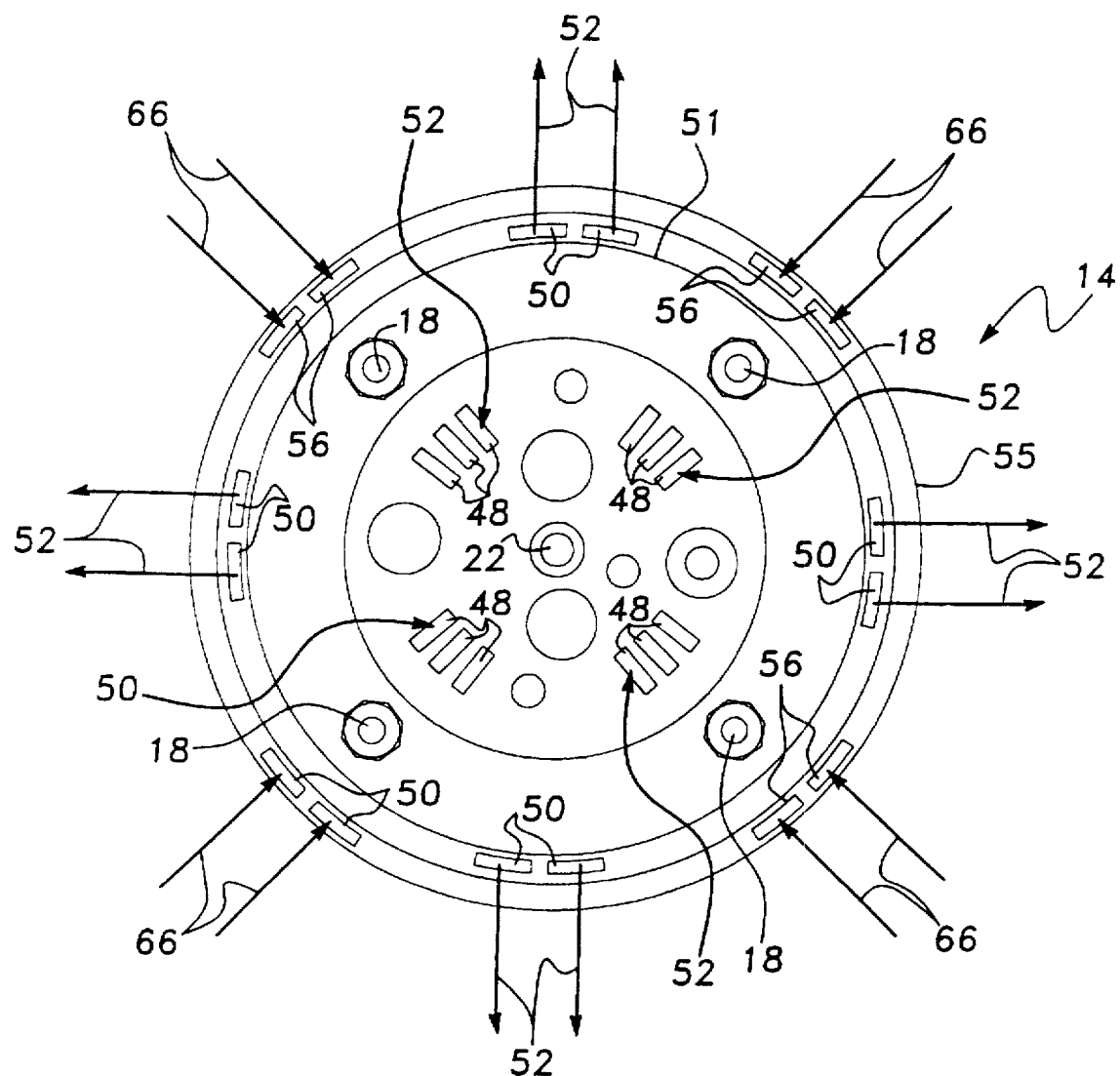
FIG. 3 is a schematic side view of the left side of the alternator of FIG. 1 indicating the position of the inlet and outlet ports on the housing.

Turning now to FIG. 3, the rear air outlet ports 50 and the front air inlet ports 56 are offset or circumferentially spaced on the cylindrical outer surfaces 51, 55 of the respective front and rear housing portions 14, 16. Circumferentially spacing the respective rear outlet ports 50 and front air inlet ports 56 prevents the respective air flow paths 52, 66, or air streams from coinciding. Thus, the efficiency and ultimate cooling capacity of the alternator 10 is maximized.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An alternator for use with a vehicle comprising:

a housing, said housing having front and rear housing portions;

a shaft, said shaft extending through and journaled within said housing;

a stator assembly connected within said housing;

a rotor connected to said shaft;

an external fan connected to said shaft adjacent said front housing;

an internal fan connected to said shaft, said internal fan disposed between said rotor and said rear housing; and a separator plate, said separator plate connected to said housing between said internal fan and said rotor and extending radially inward to define, on opposite sides thereof front and rear air control volumes within said housing, said internal fan moving air along a predetermined path through said rear control volume and said external fan moving air along a predetermined path through said front control volume.

2. An alternator as set forth in claim 1 wherein said predetermined path of said rear air control volume includes an air flow path wherein air enters said rear air control volume through a rear air inlet port and flows through said rear air control volume in an axial direction parallel to an axis of said shaft and exits said rear air control volume radially through a rear air outlet port on said housing; and said predetermined path of said front air control volume includes an air flow path wherein air enters said front air control volume radially through a front air inlet port and upon entering said front air control volume, the air flows over said stator and exits said front air control volume axially through a front air outlet port located in said front housing portion.

3. An alternator as set forth in claim 2 wherein said front air inlet port and said rear air outlet port are positioned on an outer surface of said housing, and said front air inlet port and said rear air outlet port are circumferentially spaced from one another.

4. An alternator for use with a vehicle comprising:

a housing;

a shaft, said shaft extending through and journaled within said housing a stator assembly connected to said housing;

rotor connected to said shaft;

a separator plate said separator plate connected to said housing to define a plurality of air control volumes within said housing;

a plurality of fans associated with said plurality of air control volumes on a one-to-one basis, each fan operative to move air through said associated air control volume;

said plurality of air control volumes include a front air control volume and a rear air control volume; and said fan associated with said front air control volume is an external fan and said fan associated with said rear air control volume is an internal fan.

5. An alternator for use with a vehicle comprising:

a housing;

a shaft, said shaft extending through and journaled within said housing;

a stator assembly connected to said housing;

a rotor connected to said shaft;

a separator plate, said separator plate connected to said housing to define a plurality of air control volumes within said housing;

a plurality of fans associated with said plurality of air control volumes on a one-to-one basis, each fan operative to move air through said associated air control volume; and said plurality of air control volumes includes a rear air control volume having a predetermined air flow path wherein air enters said rear air control volume through a rear air inlet port and flows through said rear air control volume in an axial direction parallel to an axis of said shaft and exits said rear air control volume radially through a rear air outlet port on said housing; and said plurality of air control volumes includes a front air control volume having a predetermined air flow path wherein air enters said front air control volume radially through a front air inlet port upon entering said front air control volume the air flows over said stator and exits said front air control volume axially through a front air outlet port located on said housing and upon exiting said front air control volume, said air is dispersed radially by said fan associated with said front air control volume.

6. An alternator for use with a vehicle comprising:

a housing; a shaft, said shaft extending through and journaled within said housing:

a stator assembly connected to said housing;

a rotor connected to said shaft;

a separator plate, said separator plate connected to said housing to define a plurality of air control volumes within said housing;

a plurality of fans associated with said plurality of air control volumes on a one-to-one basis each fan operative to move air through said associated air control volume;

said plurality of air control volumes include a front air control volume and a rear air control volume; and said rear air control volume has a predetermined air flow path wherein air enters said rear air control volume through a rear air inlet port and flows through said rear air control volume in an axial direction parallel to an axis of said shaft and exits said rear air control volume radially through a rear air outlet port on said housing; and said front air control volume has a predetermined air flow path wherein air enters said front air control volume radially through a front air inlet port, upon entering said front air control volume the air flows over said stator and exits said front air control volume axially through a front air outlet port located on said housing.

7. An alternator for use with a vehicle comprising:

a housing;

a shaft, said shaft extending through and journaled within said housing;

a stator assembly connected to said housing;

a rotor connected to said shaft;

a separator plate, said separator plate connected to said housing to define a plurality of air control volumes within said housing;

a plurality of fans associated with said plurality of air control volumes on a one-to-one basis, each fan operative to move air through said associated air control volume; and said housing includes a front air inlet port and a rear air outlet port positioned on an outer surface of said housing, and said front air inlet port and said rear air outlet port are circumferentially spaced from one another.

8. An alternator as set forth in claim 5 wherein said front air inlet port and said rear air outlet port are positioned on an outer surface of said housing, said front air inlet port and said rear air outlet port are circumferentially spaced from one another.

9. An alternator as set forth in claim 6 wherein said front air inlet port and said rear air outlet port are positioned on an outer surface of said housing, said front air inlet port and said rear air outlet port are circumferentially spaced from one another.

10. An alternator for use with a vehicle comprising:

a housing;

a shaft, said shaft extending through and journaled within said housing;

a stator assembly connected to said housing;

a rotor connected to said shaft;

a separator plate, said separator plate positioned within said housing to define a plurality of air control volumes;

a fan associated with each of said air control volumes, each fan operative to move air through said associated air control volumes;

said plurality of air control volumes including a rear air control volume having a predetermined air flow path wherein air enters said rear air control volume through a rear air inlet port and flows through said rear air control volume in an axial direction parallel to an axis of said shaft and exits said rear air control volume radially through a rear air outlet port on said housing, said plurality of air control volumes including a front air control volume having a predetermined air flow path wherein air enters said front air control volume radially through a front air inlet port, and upon entering said front air control volume the air flows over said stator and exits said front air control volume axially through a front air outlet port located on said housing;

said front air inlet port and said rear air outlet port are positioned on an outer surface of said housing, and said front air inlet port and said rear air outlet port are offset radially such that they are circumferentially spaced from one another.

11. An alternator as set forth in claim 10 wherein an internal fan moves the air along said predetermined path through said rear air control volume and an external fan moves the air along said predetermined path through front air control volume.

\* \* \* \* \*

UNITED STATES PATENT AND TRADEMARK OFFICE
CERTIFICATE OF CORRECTION

PATENT NO. : 5,751,079
DATED : May 12, 1998
INVENTOR(S) : Bo Bagherpour, et. al.

It is certified that error appears in the above-identified patent and that said Letters Patent is hereby corrected as shown below:

Title page, item [56], insert the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 0 | 46 | 31 | 5 | A | 1 | 07/81 | EPO | | | | |
| | | | 6 | 6 | 6 | 6 | 9 | 3 | 02/52 | Great Britain | | | | |
| | | | 1 | 5 | 4 | 4 | 2 | 0 | 4 | 04/79 | Great Britain | | | | |
| | | | 2 | 28 | 9 | 9 | 9 | 2 | A | 12/95 | Great Britain | | | | |
| | | | | | | | | | | | | | | |

Signed and Sealed this

Ninth Day of February, 1999

Attest:

Attesting Officer

*Acting Commissioner of Patents and Trademarks*